United States Patent
Olofsson et al.

(10) Patent No.: US 9,505,561 B2
(45) Date of Patent: Nov. 29, 2016

(54) CONVEYOR SYSTEM FOR A CHECKOUT COUNTER

(71) Applicant: ITAB SCANFLOW AB, Jönköping (SE)

(72) Inventors: Per Olofsson, Värnamo (SE); Magnus Törnvall, Jönköping (SE); Fredrik Hagstedt, Bankeryd (SE)

(73) Assignee: ITAB SCANFLOW AB, Jönköping (SE)

( * ) Notice: Subject to any disclaimer, the term of this patent is extended or adjusted under 35 U.S.C. 154(b) by 0 days.

(21) Appl. No.: 15/027,062

(22) PCT Filed: Oct. 3, 2014

(86) PCT No.: PCT/SE2014/051151
§ 371 (c)(1),
(2) Date: Apr. 4, 2016

(87) PCT Pub. No.: WO2015/053688
PCT Pub. Date: Apr. 16, 2015

(65) Prior Publication Data
US 2016/0236874 A1 Aug. 18, 2016

(30) Foreign Application Priority Data
Oct. 9, 2013 (SE) ...................................... 1351194

(51) Int. Cl.
*B65G 37/00* (2006.01)
*B65G 47/31* (2006.01)
*B65G 39/10* (2006.01)
*A47F 9/04* (2006.01)

(52) U.S. Cl.
CPC ............... *B65G 47/31* (2013.01); *A47F 9/048* (2013.01); *B65G 37/00* (2013.01); *B65G 39/10* (2013.01); *A47F 9/04* (2013.01)

(58) Field of Classification Search
CPC ...... B65G 37/00; B65G 39/10; B65G 47/31; B65G 47/22; B65G 47/24; A47F 9/048; A47F 9/04
See application file for complete search history.

(56) References Cited

U.S. PATENT DOCUMENTS

| | | | |
|---|---|---|---|
| 3,949,194 A * | 4/1976 | Catto | A47F 9/04 198/340 |
| 5,256,864 A | 10/1993 | Rando et al. | |
| 2014/0353115 A1* | 12/2014 | Baitz | A47F 9/047 198/340 |

FOREIGN PATENT DOCUMENTS

| | | |
|---|---|---|
| WO | 03/007256 A2 | 1/2003 |
| WO | 2012/005659 A1 | 1/2012 |

OTHER PUBLICATIONS

International Search Report and Written Opinion dated Jan. 29, 2015 issued in PCT Patent Application No. PCT/SE2014/051151, (9 pages).

*Primary Examiner* — Mark Beauchaine
(74) *Attorney, Agent, or Firm* — Thompson Coburn LLP; Matthew Himich

(57) ABSTRACT

A conveyor system for transporting articles in a checkout counter is provided. The system comprises a loading conveyor (24) on which articles may be placed by a customer, a second conveyor (25) arranged in series with the loading conveyor (24) which second conveyor (25) is operated at a higher speed than said loading conveyor (24) for increasing the distance between adjacent articles, wherein the loading conveyor (24) is tilted with respect to a horizontal plane in a lateral direction, and wherein said conveyor system further comprises an intermediate acceleration device (26) being arranged between the loading conveyor (24) and the second conveyor (25) for accelerating the articles when moving from the loading conveyor (24) to the second conveyor (25).

11 Claims, 4 Drawing Sheets

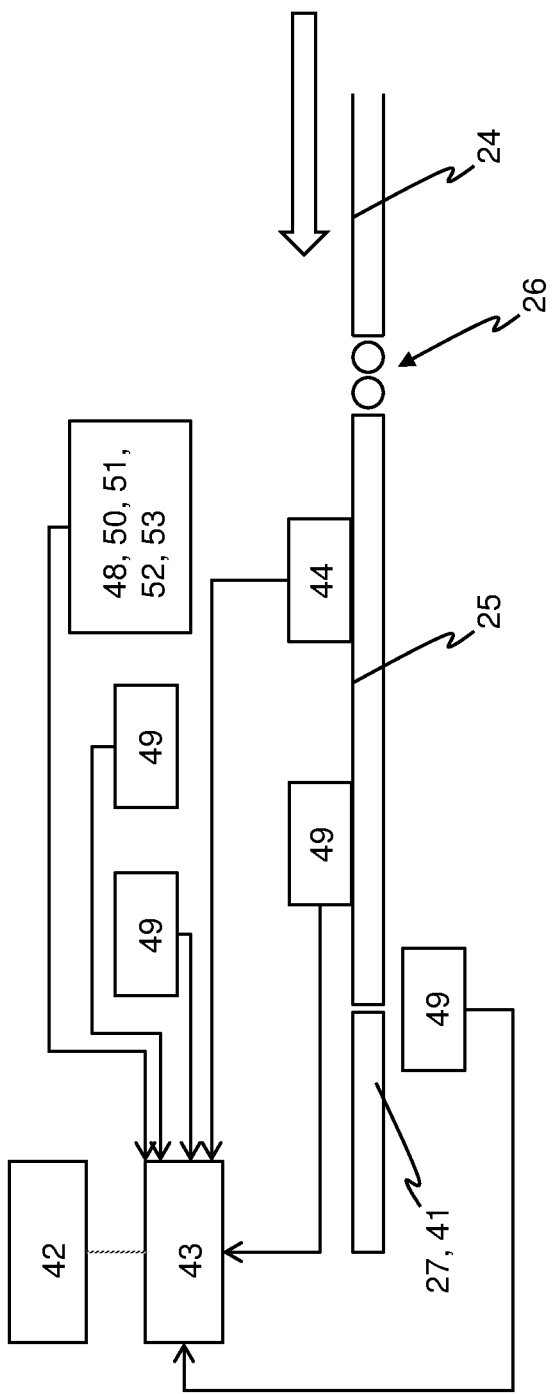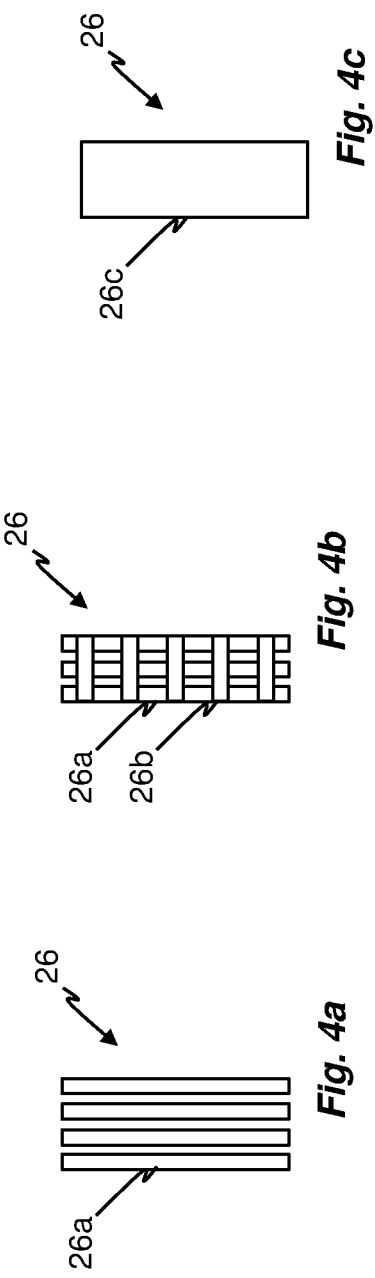

CONVEYOR SYSTEM FOR A CHECKOUT COUNTER

CROSS-REFERENCE TO RELATED APPLICATIONS

This application is a national stage application of International Patent Application No. PCT/SE2014/051151, published as WO2015/053688, which was filed on Oct. 3, 2014, which claims priority to Swedish Patent Application No. 1351194-4, filed Oct. 9, 2013, the disclosures of which are incorporated by reference herein.

TECHNICAL FIELD

The present invention relates to a conveyor system for transporting articles in an automated checkout counter as well as to an automated checkout counter comprising such conveyor system.

BACKGROUND

In today's stores many different articles, such as food products, hygiene articles, etc. may be purchased which all have different sizes and shapes. Normally, a checkout operator handles each article manually and makes sure that the article is associated with the correct pricing at checkout for payment by the customer. This is traditionally done either by manually inputting the price, by scanning a barcode attached to the article, or a combination of those. In either case a conveyor system is often provided for transporting the articles from the area of the customer to the area of the checkout operator. A conveyor system normally includes an endless belt which is driven by a pair of rollers. When a customer positions an article on the belt it is automatically transported to the operator. A second belt is often provided for further transporting the articles away from the operator and into a packing area.

In order to improve the working conditions for the operator the first belt may be arranged to align the articles such that they are received in an area which is readily reachable for the operator. One example of such system is disclosed in U.S. Pat. No. 3,949,194, in which articles having a pre-attached bar code are aligned by means of a tilted conveyor belt being supported by additional conveyor belts being arranged 90° relative the tilted belt. The additional belts are separated from each other such that a bar code reader may scan the barcodes when they pass the slit formed between the additional belts. Hence, the prior art system makes sure that the articles are transported at a constant distance from each other and allows for an automatic detection of the bar code as long as the article is positioned correctly.

Automatic checkout counters are becoming an interesting alternative for retail stores and supermarkets. Such checkout counters provides safe and easy handling of articles and they normally include different components for identifying the article accurately. Precise identification is desirable not only for ensuring proper operation without the need for operators, but also for preventing fraud. An important aspect of precise identification is the position of the articles to be identified. Therefore, there is a need for an improved system for positioning articles, especially when such system is used in automatic checkout counters.

SUMMARY

An object of the present invention is to provide a conveyor system for a checkout counter which is improved over prior art. An idea of the present invention is to provide a conveyor system for various articles, wherein the conveyor system ensures that the articles are aligned and separated from each other such that a sensor system, which is fixed relative the conveyor system, can identify the articles accurately.

According to one aspect of the present invention, a conveyor system is provided. The conveyor system comprises a loading conveyor on which articles may be placed by a customer, a second conveyor arranged in series with the loading conveyor which second conveyor is operated at a higher speed than said loading conveyor for increasing the distance between adjacent articles, wherein the loading conveyor is tilted with respect to a horizontal plane in a lateral direction, and wherein said conveyor system further comprises an intermediate acceleration device being arranged between the loading conveyor and the second conveyor for accelerating the articles when moving from the loading conveyor to the second conveyor.

The intermediate acceleration device may be configured to rotate around an axis being arranged in parallel with the lateral extension of the loading conveyor. The rotation may implemented by means of one or more rollers, which preferably are driven by an electrical motor at a speed being higher than the speed of the loading conveyor but lower than the speed of the second conveyor. Hence, a more efficient separation of articles is provided.

Said intermediate acceleration device may comprise a plurality of rollers being arranged in parallel. The plurality of rollers may further be arranged at a distance from each other thus forming a slit between each roller.

The loading conveyor, the second conveyor and the intermediate acceleration device may be tilted by the same angle. The angle may be within the range of 5-25°, and preferably approximately 10°.

The loading conveyor, the second conveyor and the intermediate acceleration device may be tilted by different angles, wherein the tilting angle of the loading conveyor may be higher than the tilting angle of the second conveyor.

One lateral end of the loading conveyor may be arranged adjacent to a sliding surface, which sliding surface is tilted 90° relative the loading conveyor.

According to a second aspect an automatic checkout counter is provided. The checkout counter comprises a conveyor system according to the first aspect.

The automatic checkout counter may further comprise a classification device for identification of articles which are moving along said conveyor system, wherein said classification device may comprise at least one spectroscopy sensor being arranged at one lateral end of said second conveyor.

BRIEF DESCRIPTION OF THE DRAWINGS

Embodiments of the invention will be described in the following; reference being made it the appended drawings which illustrate non-limiting examples of hoe the inventive concept can be reduced into practice.

FIGS. 3a-b are a top view and a side view of a checkout counter according to an embodiment of the present invention; and FIG. 4a-c are top views of an intermediate acceleration device according to different embodiments.

DETAILED DESCRIPTION OF EMBODIMENTS

Figure 1:
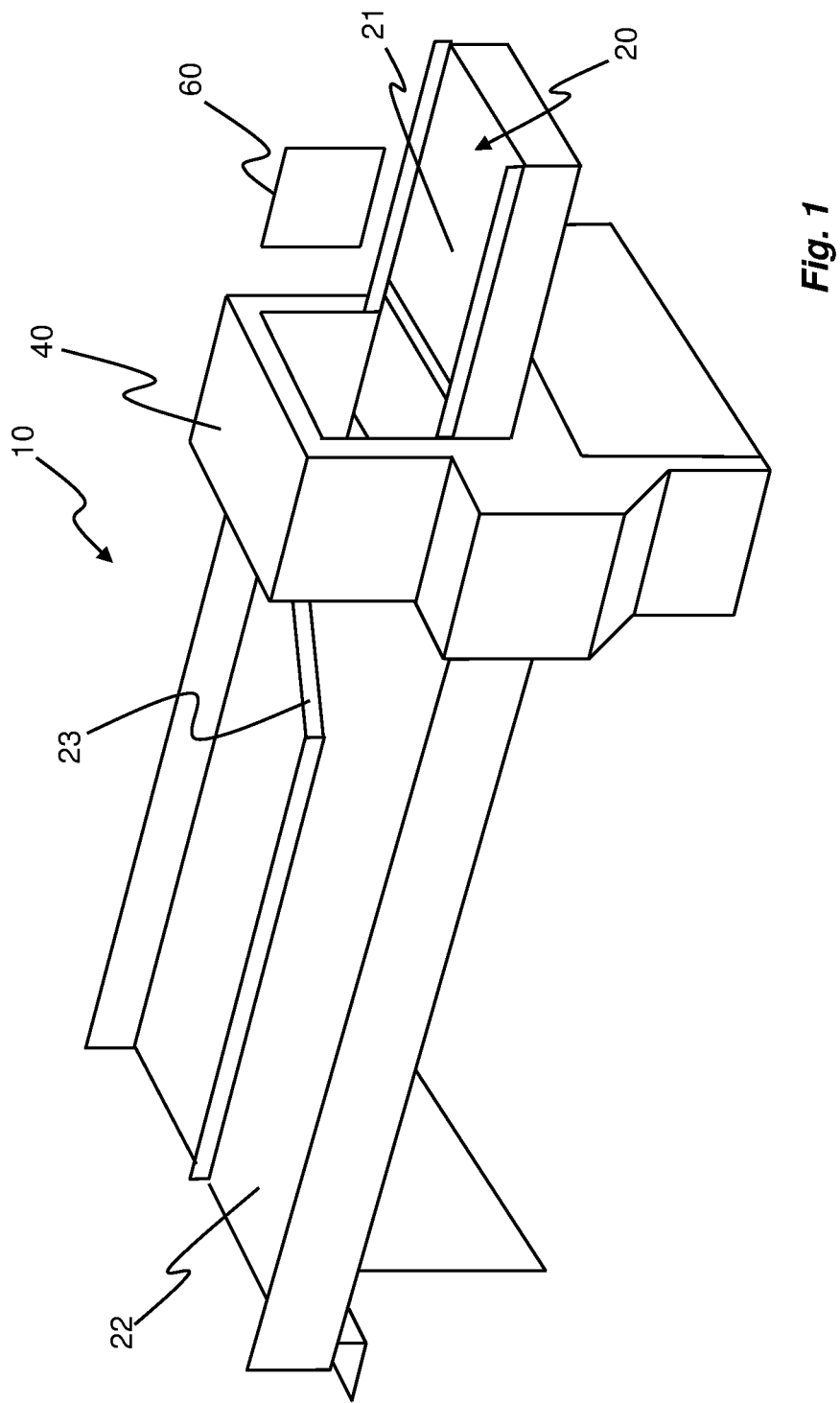
FIG. 1 is an isometric view of an automatic checkout counter according to an embodiment of the present invention.

FIG. 1 shows an automatic checkout counter 10 comprising a conveyor system 20 for transporting articles from a loading area 21 to a packing area 22, and a classification device 40 through which the articles pass for automatic identification. The identified article may be displayed on a display unit 60. During operation, a customer approaches the loading area 21 with one or more articles which are to be paid for. When a first article is positioned on the loading area 21 it will be transported through the classification device 40 whereby the article is identified. The article may be identified in terms of type, e.g. as oranges, as well as by weight, and the result of the identification is preferably shown on the display unit 60. The loading area 21 provides continuous transport of articles as long as the customer keeps adding them, and each article is transported to the packing area 22 after identification. As can be seen in FIG. 1 the packing area 22 is divided longitudinally, such that articles of two consecutive customers will not mix. Hence, a divider 23 is configured to direct the flow of articles in the packing area to one of the two portions of the packing area 22, whereby the divider is moved to direct the articles to the other portion of the packing area 22 when a new customer is occupying the checkout counter.

Figure 2A:
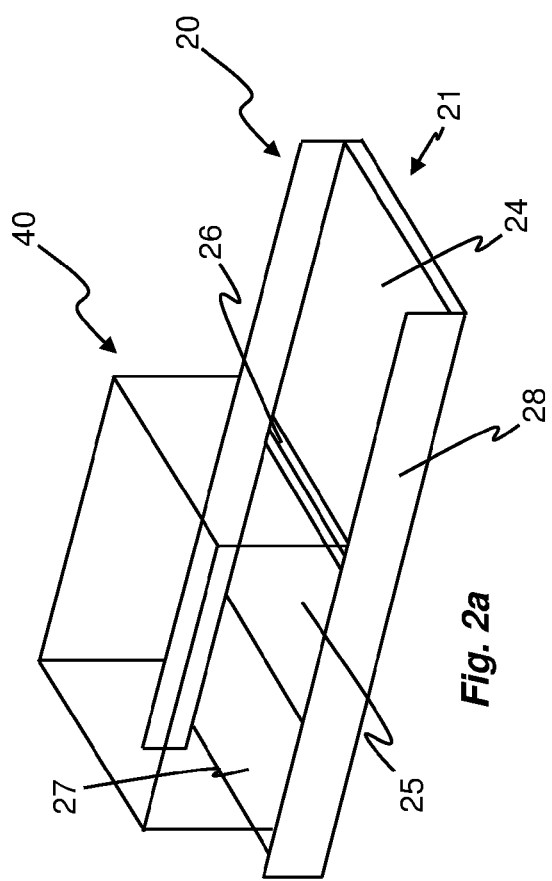
FIGS. 2a-c are different views of a conveyor system according to an embodiment of the present invention.
Figure 2B:
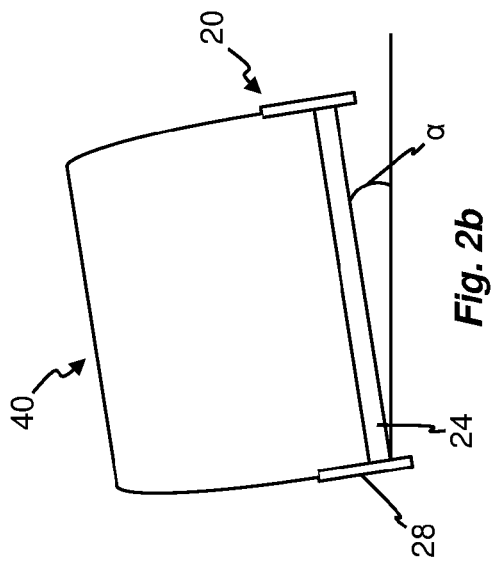
Figure 2C:
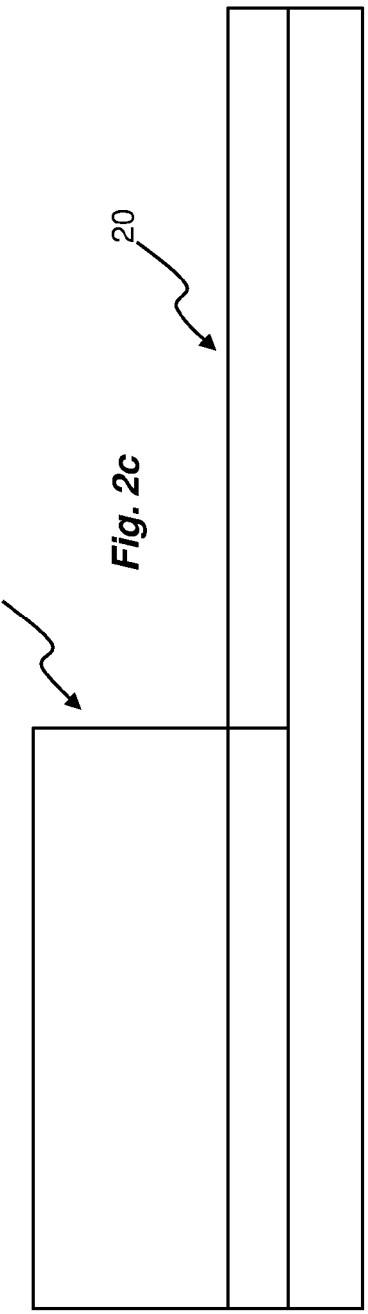

FIGS. 2a-c show the conveyor system 20 in more details. As can be seen in FIG. 2a the conveyor system 20 extends from the loading area 21, and ensures article transport through the classification device 40. The classification device 40 is further described with reference to FIGS. 3a-b.

The conveyor system 20 comprises a loading conveyor 24 on which articles may be placed by a customer, and a second conveyor 25 which is arranged in series with the loading conveyor. The identification of articles is performed by the classification device 40 as the articles are arranged on the second conveyor 25. Preferably, a third conveyor 27 is provided in series after the second conveyor 25, which third conveyor 27 comprises a weight sensor for determining the weight of the article being conveyed by the third conveyor 27.

Since a customer usually tend to place articles very close to each other on the loading conveyor 24, or even in a stacked manner, the second conveyor 25 will ensure that the articles are separated from each other longitudinally, i.e. in the direction of movement. For this, the second conveyor 25 is operated at a higher speed than the loading conveyor 24.

In a preferred embodiment, the loading conveyor 24 is moving at a speed of 0.05-0.25 m/s, and preferably at a speed of 0.15 m/s, while the second conveyor 25 is moving at a speed of 0.4-0.6 m/s, and preferably at a speed of 0.5 m/s. The third conveyor 27, i.e. the scale, is preferably configured to move the articles at the same speed as the second conveyor.

By allowing the second conveyor 25 to move faster than the loading conveyor 24 the distance between adjacent articles will increase as they are entering the classification device 40. In order to improve the separation of articles it has proven to be very efficient to provide an intermediate acceleration device 26 between the loading conveyor 24 and the second conveyor 25. The intermediate acceleration device 26 is provided in order to allow the articles to be accelerated as they are being transported from the loading conveyor 24 and the second conveyor 25.

As shown in FIG. 2a the intermediate acceleration device 26 comprises two rollers arranged in series. In a preferred embodiment each roller is driven by a motor, whereby the motor is controlled such that the outer surface of the rollers move at a speed which is higher than the speed of the loading conveyor 24 while it is lower than the speed of the second conveyor. In an embodiment, the outer surface of the rollers move at a speed of 0.2-0.3 m/s, and most preferably at 0.25 m/s.

In other embodiment, the rollers are not driven by any motor but only rotates when a moving article is in contact with the rollers 26.

Hence, when an article is approaching the longitudinal end of the loading conveyor 25 the speed of the article will increase due to the driving rotation of the rollers of the intermediate acceleration device 26. The article will thus be accelerated across the rollers, and once the article gets in contact with the second conveyor 25 the speed will increase whereby the intermediate acceleration device 26 allow for a smooth acceleration of the article.

An accurate identification of the articles by means of the classification device 40 benefits not only by a longitudinal separation, but also by having the articles aligned in a lateral direction, i.e. in a direction perpendicular to the longitudinal axis of the conveyor system 20. This is due to the fact that the classification device 40 comprises one or more identification sensors which preferably have a fixed position relative the second conveyor 25.

In order to make sure that the articles being loaded are aligned laterally the loading conveyor 24, the second conveyor 25 and the intermediate acceleration device 26 are tilted in the lateral direction with respect to a horizontal plane. This is shown in FIG. 2b, in which the conveyor system 20 and the classification device 40 are illustrated from an end view.

In an alternative embodiment only the loading conveyor 24 and the intermediate acceleration device 26 may be tilted, while the second and third conveyors 25, 27 are aligned in a plane being parallel with a horizontal plant. In a yet further embodiment, only the loading conveyor 24 is tilted, while the intermediate acceleration device 26 and the second and third conveyors 25, 27 are aligned in parallel with a horizontal plant.

In further embodiments the loading conveyor 24 is tilted by a first tilt angle $\alpha_1$, the intermediate acceleration device 26 is tilted by a second tilt angle $\alpha_2$, the second conveyor 25 is tilted by a third tilt angle $\alpha_3$, and the third conveyor 27 is tilted by a fourth tilt angle $\alpha_4$, wherein $\alpha_1 \geq \alpha_2 \geq \alpha_3 \geq \alpha_4$. In a preferred embodiment, $\alpha_1 = \alpha_2 = \alpha_3 = \alpha_4$.

By tilting at least the loading conveyor 24 the articles are sliding downwards by means of gravity until they reach one lateral side 28, the side to which the conveyor system 20 is tilted downwards, of the loading conveyor 24. The tilting angle $\alpha$ is preferably between 5° and 25°, and more preferably 10°. A sliding surface is provided at the lateral end 28 for preventing articles from falling out from the conveyor 24. The sliding surface is preferably made of Teflon, or other similar low-friction material. Once the articles are aligned in the transversal direction, the lateral position will be maintained throughout the conveyor system 20.

A major advantage associated with tilting at least the loading conveyor 24 for placing the articles is that the components and sensors of the classification device 40 may be arranged at fixed locations and still be able to identify the article correctly. Should the articles be randomly distributed across the width of the second conveyor 25 the components and sensors of the classification device 40 must be movable depending on the position of the article. By having the components and sensors on fixed locations the classification device 40 may be made less complex and less expensive, and the accuracy of determining article identities will further be improved.

Figure 3A:
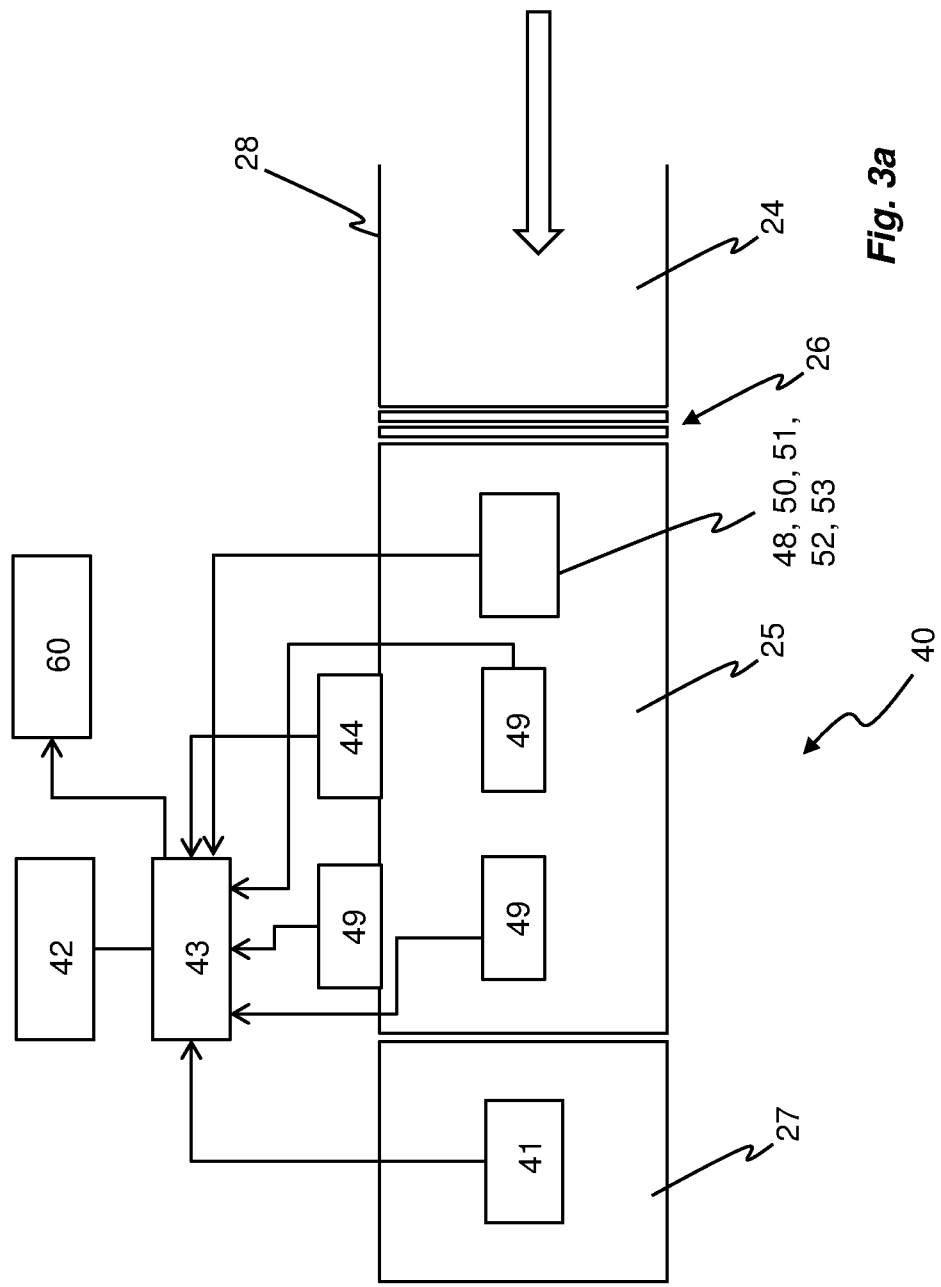

FIG. 3a and FIG. 3b show a classification device 40 according to one embodiment, where the classification device 40 comprises substantially the same components, sensors and controllers as is described in WO 2012/005659 by the same applicant.

According to an embodiment, the classification device 40 comprises a weight sensor 41 for weighing the article, being incorporated in the third conveyor 27, a memory unit 42 comprising information of one or more articles, a processor 43 connected to the memory unit 42 and to the weight sensor 41, and at least one spectroscopy sensor 44, from here on denoted as a NIR or a VIS sensor 44 depending on the associated wavelength interval, connected to the processor 43. The NIR and/or VIS sensor is arranged at a lateral end of the second conveyor 25 and is facing towards the articles passing.

The NIR or VIS sensor 44 detects a reflection spectrum from an article, whereby the processor 43 is configured to match the measured reflection spectrum with a database of reference spectrums, whereby each reference spectrum is associated with a unique article identity. Hence, different articles will provide a unique reflection spectrum whereby an accurate identification may be achieved for articles not carrying a bar code.

The NIR or VIS sensor 44 must thus be capable of detecting the reflection spectrum for a wide variety of articles having different dimensions. For example, such articles include both small packages of chewing gum as well as larger articles, such as large packages of toilet paper, diapers, etc. In order to be able to measure such reference spectrum in a reliable manner the NIR or VIS sensor 44 is preferably arranged on a support, which support is configured to be moveable such that the NIR or VIS sensor 44 may be directed towards the article passing. Hence, a first sensor, such as a camera, is configured to provide information corresponding to the dimensions of the article. The information is transmitted to the processor 43, which then calculates a correct angle of the NIR or VIS sensor 44, i.e. an angle relative the horizontal plane. If the article is very small, such as the chewing gum, the NIR or VIS sensor 44 is directed towards the conveyor belt 25, i.e. downwards. Should the article be large, such as a package of diapers, the NIR or VIS sensor 44 will be directed upwards.

As already discussed briefly above, the memory unit 42 comprises one or more digital signatures created by the at least one spectroscopy sensor 44, wherein each one of said signatures is associated to a corresponding article identity. A benefit of the classification device 40 is that the checkout counter 10 automatically may identify all sorts of articles without any need for the customer to identify the article before the checkout counter, e.g. with a barcode. The NIR or VIS sensor 44 is particularly valuable for identifying fruit and vegetables, and certain types of bulk articles, since these articles have previously required the customer to mark the article with a bar code due to the fact that sensors using cameras and image processing have not been able to determine the article identity accurately enough.

The third conveyor 27, including the scale 41, is configured to detect the weight of the article and transmit such information to the processor 43. This allows for two advantages, namely i) to provide a correct pricing for such articles which are priced based on the weight, and ii) to prevent fraud, in case a customer tries to replace the barcode of an expensive article with a barcode of a cheap article. For example, should a barcode of a cheap magazine be placed on an expensive piece of meat, the weight sensor 41 may in fact be used to compare the weight of the article with a reference weight stored in the memory 42. Hence, such fraud will be detected and an alarm may be triggered.

The identity of the article may be determined by matching a measured signature to a database comprising properties of a plurality of articles. The database may be stored in the memory unit 42 and examples of properties are reflection spectrum, weight, size, color, shape, contour, barcode patterns and/or text and/or figure and/or pattern.

The display unit 60 may be connected to the processor 43 for displaying at least one article identity. The display unit 60 is preferably arranged for use by a customer for approving the displayed information. If the first NIR or VIS sensor 44 identifies the article, an image or a text is shown in the display unit 60 and if the user finds the displayed information matching the article which presently is in the checkout counter 10 the customer may approve the identity by manual input. Further information may be displayed, e.g. weight and price, wherein the user may approve the displayed information if it is correct.

According to one embodiment the checkout counter 10 may, as a compliment to the first NIR or VIS sensor 44 and the weight sensor 41, be provided with one or several further sensors which, if used according to the invention, brings out the advantage of increasing the security when identifying the article, but with a minimum use of resources and time and energy. It should be mentioned here that an article should preferably be identified in less than one second for an automated checkout counter to be considered as user friendly by the customers.

The classification device 40 may further use a further sensor being selected from the group consisting of: an additional spectroscopy sensor (not shown), a contour sensor 48, a barcode reading system 49, a symbol reading sensor 50, a color texture sensor 51, a color histogram sensor 52, or an object sensor 53. The contour sensor 48, the symbol reading sensor 50, the color texture sensor 51, the color histogram sensor 52, and the object sensor 53 may all be implemented by one or several cameras which is connected to the processor 43, which processor 43 is configured to provide a specific image computing algorithm for extracting the required information from the image.

As can be seen in FIG. 3b the bar code reading system 49 comprises one or more readers. One reader 49 may be arranged at a lateral end of the second conveyor 25 thus scanning inwards towards the articles passing. Further, additional bar code readers for creating a complete coverage of the articles may be provided. Hence, an upper, lower, left, right, front, and back side of the article could thus be scanned by the readers 49 indicated in FIG. 3a. In a particular embodiment, a bar code reader is positioned under a slit formed between the second conveyor 25 and the third conveyor 27 and scanning upwards, such that a bar code becomes visible when it moves between the conveyors 24, 25.

In a preferred embodiment, two more bar code readers 49 are provided above the second conveyor 25 and facing downwards. These readers 49 may have different focus, such that one of these readers 49 are configured to detect barcodes arranged at a distance of approximately 0-2 cm above the conveyor belt 25, while the other is configured to detect barcodes arranged at a distance larger than 1.5 cm above the conveyor belt 25.

As can be seen in FIG. 3b, the loading conveyor 24, the intermediate acceleration device 26, the second conveyor 25, and the third conveyor 27 are aligned in parallel.

The processor 43 is further configured to control the operation of the loading conveyor 24, the intermediate acceleration device 26, the second conveyor 25, and the third conveyor 27.

As an example, a rounded article, such as a melon, may be subject to identification by the classification device 40. Due to its round shape it will most likely not lay still as it is accelerated by the second conveyor 25. Hence the movement will not be accepted by the third conveyor 27 when weighing the article. The processor thus detects the movement, e.g. by the camera 48, 50, 51, 52, 53, whereby the processor stops the driving mechanisms of the third conveyor belt 27. In order to ensure that only one article at the time is passing through the classification device 40 the processor 43 also stops the movement of the loading conveyor, the intermediate acceleration device 26, and the second conveyor 25. Once the article has stopped its movement, the scale 41 may measure an accurate weight and the processor 43 thus commands start of the conveyors 24, 25, 27 as well as of the intermediate acceleration device 26.

Now turning to FIG. 4a-c, different embodiments of the intermediate acceleration device 26 will be described. The main purpose of the intermediate acceleration device 26 is to provide a separation of articles when they are accelerated from a first speed, defined by the loading conveyor 24, to a second speed, defined by the speed of the second conveyor 25. As already been described, the intermediate classification device 26 may comprise two rollers which are driven by one or two electrical motors at a speed between the speed of the loading conveyor 24 and the speed of the second conveyor 25.

The intermediate acceleration device 26 may also be implemented as only one roller, which may be driven by an electrical motor. In case of one roller only, it is also possible to allow the roller to rotate freely whereby articles may be accelerated over the roller as the second conveyor increases the speed of the article, while a part of the article is still in contact with the roller. In those embodiments where the intermediate acceleration device 26 is formed by one roller only, the roller may be spaced apart from the loading conveyor 25 and/or from the second conveyor 27 such that a small slit is formed between the roller and at least one adjacent conveyor 25, 27.

In FIG. 4a another embodiment is shown, wherein the intermediate acceleration device 26 includes four rollers 26a. These are arranged in series. One or several of the rollers 26 may be driven by electrical motors, and the speed may be the same for all rollers. In another embodiment, the speed of the rollers 26a is increasing in the direction of movement. Hence, the first roller 26a arranged adjacent to the loading conveyor 24 may have a speed which is lower than the speed of the roller 26a being arranged adjacent to the second conveyor 25.

In FIG. 4b another embodiment is shown, wherein the intermediate acceleration device 26 includes two or more driven rollers 26a which are connected by several endless strips 26b. Hence, the strips 26b forms a surface onto which the article may rest upon, whereby such configuration allows the rollers 26a to be separated from each other.

A yet further embodiment is shown in FIG. 4c, wherein the intermediate acceleration device 26 is formed by an endless belt 26c. Here, the length of the belt 26c is substantially less than the width of the belt 26c.

A general principle of the conveyor system 20 is to provide transport of articles through a classification device, whereby the articles are separated from each other and wherein the lateral position of each article is fixed.

Hence, the loading conveyor 24, the intermediate acceleration device 26, the second conveyor 25, and the third conveyor 26 is preferably equipped with a surface having a sufficient friction in order to prevent the articles from sliding. Especially, the intermediate acceleration device 26 should have a friction which is at least equal to the friction of the loading conveyor 24. Correspondingly, the friction of the second conveyor 25 should be at least equal to the friction of the intermediate acceleration device 26.

It should be appreciated that even though numerous characteristics and advantages of the present invention have been set forth in the foregoing description, together with details of the structure and function of the invention, the description is only illustrative and changes may be made in detail, especially in matters of shape, size and arrangement of parts within the scope of the invention to the full extent indicated by the appended claims.

What is claimed is:

1. A conveyor system for transporting articles in a checkout counter, comprising
   a loading conveyor (24) on which articles may be placed by a customer, a second conveyor (25) arranged in series with the loading conveyor (24) which second conveyor (25) is operated at a higher speed than said loading conveyor (24) for increasing the distance between adjacent articles, wherein
   the loading conveyor (24) is tilted with respect to a horizontal plane in a lateral direction, and wherein said conveyor system further comprises
   an intermediate acceleration device (26) being arranged between the loading conveyor (24) and the second conveyor (25) for accelerating the articles when moving from the loading conveyor (24) to the second conveyor (25).

2. The conveyor system according to claim 1, wherein the intermediate acceleration device (26) is configured to rotate around an axis being arranged in parallel with the lateral extension of the loading conveyor (24).

3. The conveyor system according to claim 1, wherein said intermediate acceleration device (26) comprises a plurality of rollers (26a) being arranged in parallel.

4. The conveyor system according to claim 3, wherein the plurality of rollers (26a) are arranged at a distance from each other thus forming a slit between each roller (26a).

5. The conveyor system according to claim 1, wherein the loading conveyor (24), the second conveyor (25) and the intermediate acceleration device (26) are tilted by the same angle.

6. The conveyor system according to claim 5, wherein the angle is within the range of 5-25°.

7. The conveyor system according to claim 1, wherein the loading conveyor (24), the second conveyor (25) and the intermediate acceleration device (26) are tilted by different angles.

8. The conveyor system according to claim 1, wherein a tilting angle of the loading conveyor (24) is higher than a tilting angle of the second conveyor (25).

9. The conveyor system according to claim 1, wherein one lateral end (27) of the loading conveyor (24) is arranged adjacent to a sliding surface, which sliding surface is tilted 90° relative the loading conveyor (25).

10. An automatic checkout counter comprising a conveyor system (20) having a loading conveyor (24) on which articles may be placed by a customer, a second conveyor (25) arranged in series with the loading conveyor (24) which second conveyor (25) is operated at a higher speed than said loading conveyor (24) for increasing the distance between adjacent articles, wherein the loading conveyor (24) is tilted with respect to a horizontal plane in a lateral direction, and wherein said conveyor system further comprises an intermediate acceleration device (26) being arranged between the loading conveyor (24) and the second conveyor (25) for accelerating the articles when moving from the loading conveyor (24) to the second conveyor (25).

11. The automatic checkout counter according to claim 10, further comprising a classification device (40) for identification of articles which are moving along said conveyor system (20), wherein said classification device (40) comprises at least one spectroscopy sensor (44) being arranged at one lateral end of said second conveyor (25).

\* \* \* \* \*